No. 718,966. PATENTED JAN. 20, 1903.
A. H. GRIMM.
DISK SHARPENER.
APPLICATION FILED OCT. 24, 1902.
NO MODEL.
2 SHEETS—SHEET 1.
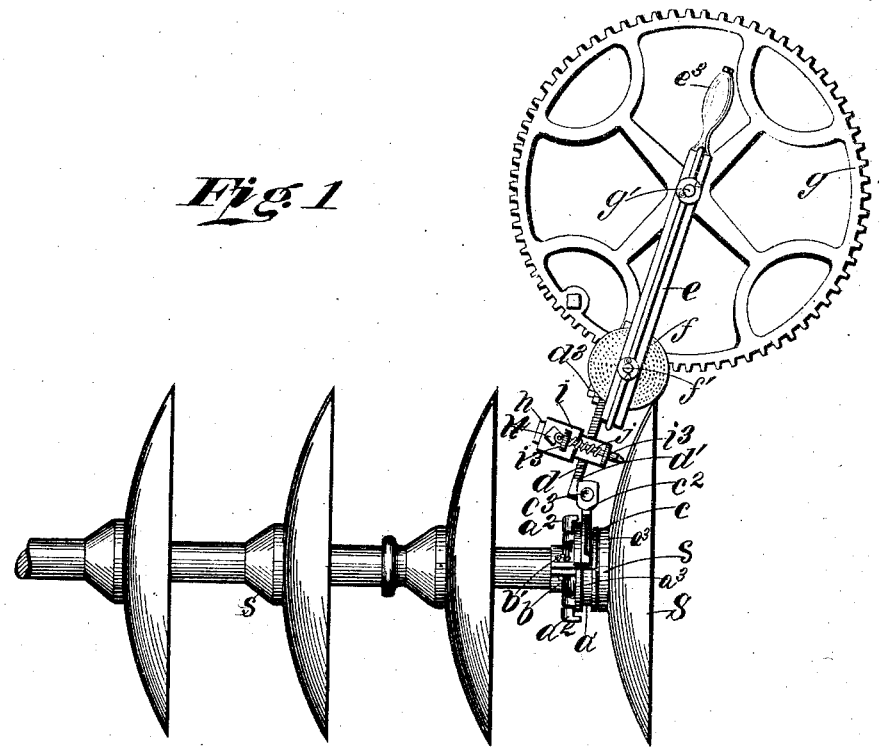
Fig. 1
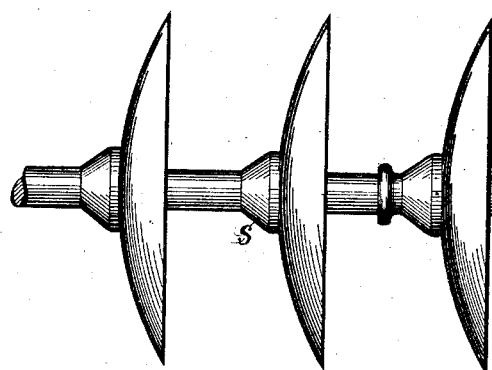
Fig. 2
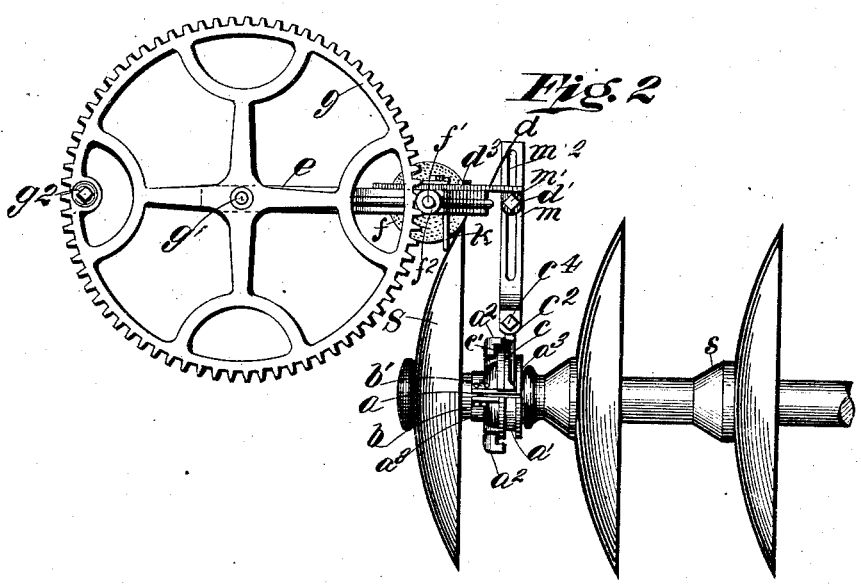
WITNESSES:
C. Edward Duffey
James R. Mansfield
INVENTOR
Asmus H. Grimm
By Alexander T. Dowell
Attorneys.

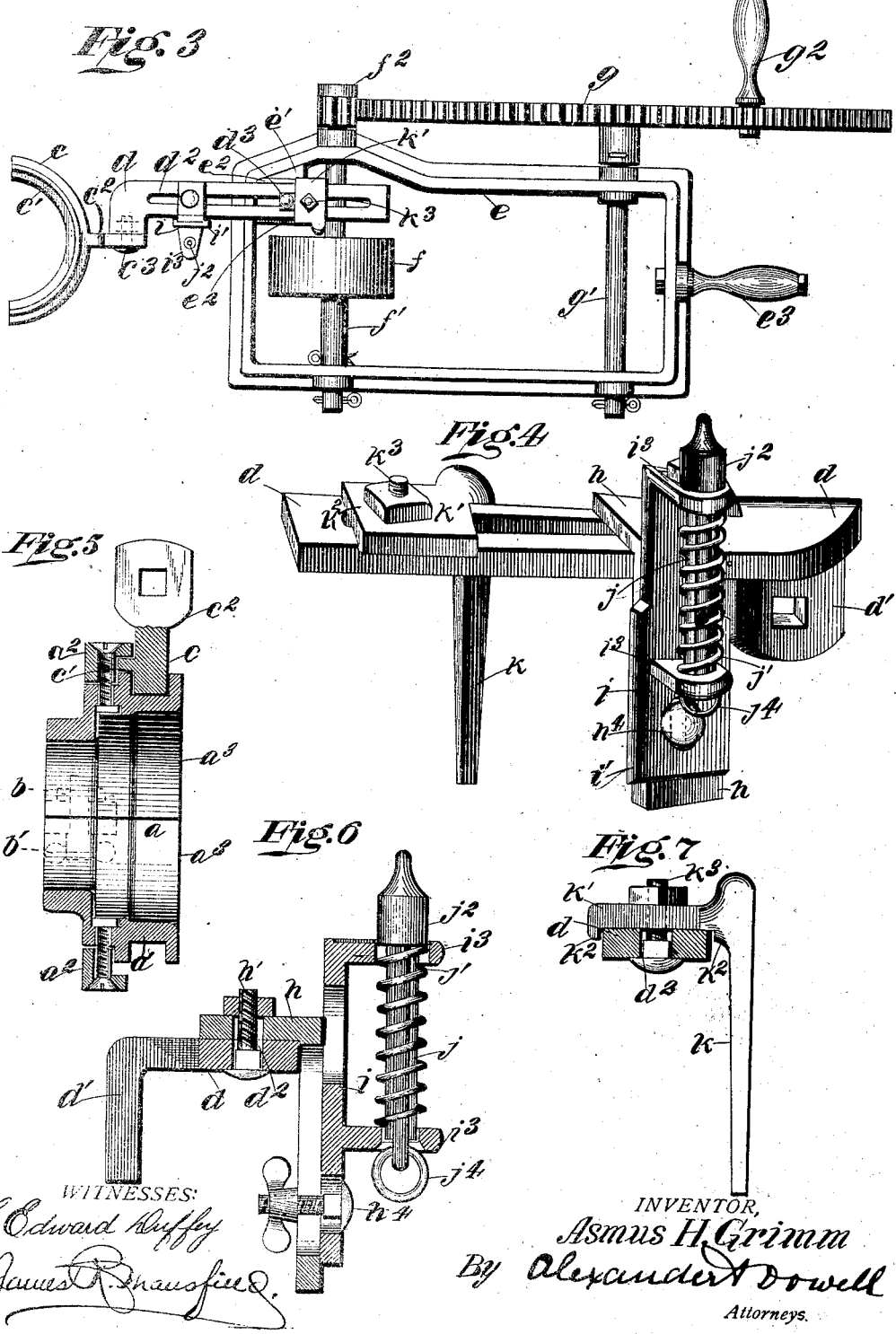

UNITED STATES PATENT OFFICE.

ASMUS HENRY GRIMM, OF ROCK ISLAND, ILLINOIS.

DISK-SHARPENER.

SPECIFICATION forming part of Letters Patent No. 718,966, dated January 20, 1903.

Application filed October 24, 1902. Serial No. 128,617. (No model.)

*To all whom it may concern:*

Be it known that I, ASMUS HENRY GRIMM, of Rock Island, in the county of Rock Island and State of Illinois, have invented certain new and useful Improvements in Disk-Sharpeners; and I hereby declare that the following is a full, clear, and exact description thereof, reference being had to the accompanying drawings, which form part of this specification.

This invention is an improved grinding-machine especially designed for sharpening the disks of disk harrows, and it is intended to provide a machine which will sharpen the disks and not merely scrape them, as is done by some machines heretofore used.

The principal object of the invention is to provide a portable machine which can be readily attached to a disk harrow and used to sharpen the disks thereon without removing the disks from the harrow-frame.

In using machines heretofore employed for grinding harrow-disks it has been necessary to remove the disks which were to be sharpened from the harrows, which involved a good deal of time and labor, while by my invention the disks may be sharpened without removing them from their place in the harrow. Disk harrows ordinarily consist of a series of disks in axial alinement and are ordinarily fastened together by means of a through-bolt and spaced apart by sleeves inserted between adjoining disks.

My improved sharpener comprises a supporting-collar which may be detachably fastened on the axle or sleeve of the harrow between the disks, a support detachably connected to said collar, so it can be swung around the disks, a frame adjustably attached to said support, and grinding wheel or disk rotatably journaled in said frame, mechanism for rotating said disk, and means for regulating the depths of cut of the grinding-disk, the whole apparatus being such that the operator can attach the machine to the harrow adjacent to any disk or disks which it is desired to sharpen. He can then grind the edges of said disks readily and easily, it only being necessary to move the harrow occasionally, so as to bring any unground edges of the disk into position to be operated upon by the machine.

The machines may be made of different sizes. I prefer to make two sizes thereof, one of which will operate on disks from fourteen to twenty inches in diameter and the other on disks of over twenty inches in diameter.

The machine is so constructed that it can be used either on the inner or outer edges of the disks, but preferably operates on the outer convex sides thereof, as indicated in the drawings.

The invention will be fully understood from the following detailed description, in connection with the drawings, which illustrate a practical form of the machine and the manner of using same. I do not wish, however, to confine myself to the specific construction of parts shown, as they can be readily changed within the scope of the invention, and I refer to the claims for summaries of the essential parts and features of the invention for which I desire protection.

In said drawings, Figure 1 a side view of a portion of a disk harrow, showing the machine adjusted to sharpen the right-hand disk. Fig. 2 is a similar view showing the machine adjusted to sharpen the left-hand disk. Fig. 3 is an enlarged plan view of the machine detached from the collar. Fig. 4 is an enlarged perspective view of the support and the adjustable devices for regulating the depth of cut. Fig. 5 is an enlarged sectional view through the collar and yoke. Fig. 6 is an enlarged sectional view of the support and spring regulating device. Fig. 7 is a similar view of the other regulating device.

As illustrated in the drawings, the machine comprises a collar adapted to be detachably fastened to the disk sleeve or axle, a yoke detachably engaged with the collar, a standard pivotally attached to the yoke, a grinding mechanism adjustably attached to the standard, and devices for regulating the depth of cut of grinding-disk.

The collar $a$ is composed of two similar sections $a^3$, which can be clamped together upon the sleeve $s$ of the harrow, as indicated in the drawings, adjacent to one of the disks S thereon which it is desired to sharpen. The parts of the collar may be secured together by means of bolts $b$ and thumb-screws $b'$. The collar is also provided with a circumferential groove $a'$ and at diametrically opposite points with L-lugs $a^2$ for a purpose hereinafter explained.

The yoke $c$ is adapted to loosely embrace the collar $a$ and fit within the groove $a'$ thereof and is provided with a flange $c'$, which orks under the lugs $a^2$ and is thereby held to the collar except when the yoke is turned to a position perpendicular to the plane of the two L-lugs. To the stem $c^2$ of the yoke is attached a slotted standard $d$, having a perforated lug $d'$ on its lower end connected to the stem $c^2$ by a bolt $c^3$. To this standard is connected a frame $e$, having a perforated lug $e'$, by which it is connected to the standard by a bolt $d^3$, engaging the slot $d^2$ in the standard $d$, which permits the frame $e$ to be adjusted toward or from the collar to suit various sizes of disks. The frame $e$ may be provided with flanges $e^2$, which embrace the sides of the standard $d$ and prevent the frame $e$ turning on bolt $d^3$. Within the frame $e$ is journaled a shaft $f'$, on which is mounted a grinding-disk $f$, of any suitable material. On one end of this shaft is a small pinion $f^2$, which meshes with the driving-gear $g$ on a shaft $g'$, journaled in the frame $e$, and is provided with a handle $g^2$, by which it can be rotated by hand. The frame $e$ is also provided with a handle $e^3$, by which it can be guided, so as to control the action of the grinding-disk.

A device for regulating the depth of the cut of the grinding-disk is attached to the standard $d$. Two such devices are shown, one being employed when the machine is operated in the upright position, Fig. 1, and the other when the machine is operated in the horizontal position, Fig. 2. The first of these devices consists of a guide-casting $h$, adjustably attached to the standard $d$ below frame $e$ by the bolt $h'$. This guide stands at right angles to the standard. Adjustably mounted on the guide is a casting $i$, having side flanges $i'$, which embrace the sides of the guide. Casting $i$ is adjustably secured to the guide by means of the bolt $h^4$, engaging slots in the guide and casting, as shown in Fig. 6. From the casting $i$ project perforated lugs $i^3$, in which is guided a bolt $j$, which is projected outwardly by means of a spring $j'$, interposed between a shoulder $j^2$ on the bolt and the inner lug $i^3$. The bolt is confined in place by means of ring $j^4$ or other suitable device. The other controlling device consists of a finger $k$, which projects at right angles to standard $d$ and lies close beside the grinding-wheel and on the side opposite bolt $j$. This finger $k$ is attached to a plate $k'$, provided with flanges $k^2$, embracing the sides of the standard $d$ and adjustably secured to this standard by means of a bolt $k^3$. The slot-and-bolt connections of these regulators and standard enable them to be adjusted on the standard $d$, so as to regulate the depths of the cut made by the grinding-bolt with great nicety.

When the apparatus is used to sharpen the disks, as indicated in Fig. 1, the collar is fastened to the axle or hub of the disk, the yoke slipped on the collar, and the frame and standard raised to substantially vertical position, the frame being upheld in operative position by one hand of the operator, and with the other hand the operator turns the driving-gear $g$ and draws the frame toward the disk, so as to bring the grinding-disk into contact with the edge of the harrow-disk and grinds the latter until the bolt $j$ prevents the further effective operation of the grinding-disk. The operator shifts the machine right or left by swinging it around on the collar until the upper portion of the harrow-disk is sufficiently sharpened. Then by moving the harrow bodily he can bring up any unsharpened portion of the harrow-disk into position to be operated upon. When operating on the left-hand disk, as indicated in Fig. 2, a supplementary standard $m$ is employed. This is simply a casting the lower end of which is attached to the stem $c^3$ by means of the bolt $c^4$, while the lug $d'$ of casting $d$ is adjustably attached to the upper slotted portion of the standard $m$ by means of the bolt $m'$, passing through lug $d'$ of standard $d$ and the slot $m^2$ in casting $m$. This enables the collar to be secured on the sleeve adjacent to the left-hand harrow-disk and the standard $d$ and frame $e$ to be lowered to a horizontal position and bring the grinding-disk $f$ against the outer face of the left-hand disk, as indicated in Fig. 2, where it is manipulated substantially as above described to sharpen the edges of the harrow-disk, the depths of cut of the grinding-disk $f$ being now regulated by means of the finger $k$.

From the foregoing description, in connection with the drawings, the operation of the apparatus will be sufficiently clear, and it will be noted that the machine can be readily applied to any portion of the harrow and used upon any disk thereof without having to disconnect the latter from the harrow-frame. The machine can be readily applied to or detached from the harrow and can be used wherever the harrow may be in the field or barn. The machine being small can be readily transported and does not require any particular skill or power in its operation. It will also be observed that various changes can be made in the form and construction of the several parts of the machine, so that its general appearance might be wholly changed, while retaining all the essential features of the invention. Such variations I consider within the scope of my invention and claims. The machine may also be utilized for sharpening other implements, and I do not restrict myself to specific use thereof herein set forth.

Having thus described my invention, what I therefore claim as new, and desire to secure by Letters Patent thereon, is—

1. A machine for sharpening disk harrows, comprising a standard, adapted to be detachably supported upon the sleeve or shaft of a disk harrow, a frame adjustably supported on said standard, a grinding-disk journaled in said frame and means for rotating said disk.

2. In combination a standard, means for supporting said standard upon the hub or axle of a disk harrow, a frame adjustably connected with said standard, a grinding-disk journaled in said frame, a gearing on said frame for rotating said disk, and a device for regulating the cut of the grinding-disk.

3. In a disk-harrow sharpener, the combination of a standard adapted to be attached to the sleeve or axle of a disk harrow, a frame adjustably attached to said standard, a grinding-disk mounted on said frame, and a device for regulating the depths of the cut of the grinding-disk adjustably attached to said standard.

4. A machine for sharpening disk harrows, comprising a standard, means for detachably supporting it upon the sleeve or shaft of a disk harrow, a frame attached to said standard, a grinding-disk journaled in said frame, means for rotating said disk on said frame, and a manipulating-handle attached to said frame.

5. In a harrow-disk sharpener, the combination of a yoke detachably attached to the disk, sleeve or axle, a slotted standard mounted on said frame, and a device for regulating the depths of the cut of the grinding-disk, said device comprising a guide-piece adjustably attached to the standard and a spring-bolt adjustably attached to said guide-piece.

6. In a machine for sharpening harrow-disks, the combination of a collar adapted to be detachably attached to the hub, sleeve or axle of the harrow adjacent to the disk to be sharpened, a standard detachably attached to said collar, a frame adjustably attached to said standard, a grinding-disk journaled in said frame, and gearing for rotating said disk in said frame.

7. In a machine for sharpening harrow-disks, the combination of a collar adapted to be detachably attached to the hub, sleeve or axle of the harrow adjacent to the disk to be sharpened, a standard detachably attached to said collar, a frame adjustably attached to said standard, a grinding-disk journaled in said frame, and gearing for rotating said disk in said frame; with a device for regulating the depths of cut made by the grinding-disks adjustably attached to the standard adjacent to the frame.

8. A machine for sharpening the disks of disk harrows, comprising a yoke, means for detachably securing said yoke to the hub or axle of the harrow adjacent to the disk to be sharpened, a casting attached to said yoke, a standard attached to said casting, a frame attached to said standard, a grinding-disk journaled in said frame, and gearing for rotating said disk.

9. A machine for sharpening the disks of disk harrows, comprising a yoke, means for detachably securing said yoke to the hub or axle of the harrow adjacent to the disk to be sharpened, a casting attached to said yoke, a standard attached to said casting, a frame attached to said standard, a grinding-disk journaled in said frame, and gearing for rotating said disk; with a device for regulating the depths of cut made by the grinding-disks adjustably attached to the standard adjacent to the frame.

10. In a machine for sharpening disk harrows, the combination of a grooved collar detachably attached to the hub, sleeve or axle of the harrow adjacent to the disk to be sharpened, a yoke detachably attached to said collar, a standard attached to said yoke, a frame adjustably attached to said standard, a grinding-disk journaled in said frame, and gearing for rotating said disk mounted in said frame.

11. A machine for sharpening disk harrows, comprising a standard, means for detachably supporting it upon the sleeve or shaft of the harrow, a frame adjustably connected with said standard, a grinding-disk journaled in said frame and gearing on said frame for rotating said disk, a manipulating-handle attached to said frame, and a device for regulating the cut of the grinding-disk attached to said standard.

12. In a harrow-disk sharpener the combination of a yoke adapted to be supported on the disk sleeve or axle, a slotted standard attached to said yoke, a frame adjustably attached to said standard, a grinding-disk mounted on said frame, a manipulating-handle for guiding said frame, and devices for regulating the depth of the cut of the grinding-disk adjustably attached to said standard.

13. A machine for sharpening harrow-disks comprising a standard, means for detachably supporting it upon the sleeve or shaft of the harrow, a frame attached to said standard, a grinding-disk journaled in said frame, means for rotating said disk on said frame, a manipulating-handle attached to said frame, and a device for regulating the cut of the grinding-disk adjustably attached to said standard.

14. In a machine for sharpening disk harrows, the combination of a grooved collar adapted to be removably attached to the hub sleeve or axle of the harrow adjacent to the disk to be sharpened, a yoke detachably attached to said collar, a slotted standard attached to said yoke, a frame adjustably attached to said standard, a grinding-disk journaled in said frame, gearing for rotating said disk mounted in said frame, and handles for guiding said frame and rotating said disk.

15. In a disk-harrow sharpener the combination of a yoke adapted to be supported on the disk sleeve, a slotted standard attached to said yoke, a frame adjustably attached to said standard, a grinding-disk and gearing for rotating said disk mounted on said frame, and a device for regulating the depths of the cut of the grinding-disk, said device comprising a guide-piece adjustably attached to the standard, a casting adjustable on said guide-piece and a spring-actuated bolt guided in lugs on said casting.

16. A machine for sharpening harrow-disks comprising a yoke, means for detachably securing said yoke to the hub or axle of the harrow adjacent to the disk to be sharpened, a slotted casting adjustably attached to said yoke, a slotted standard adjustably attached to said casting, a frame adjustably attached to said standard, a grinding-disk journaled in said frame, and gearing for rotating said disk journaled on said frame.

17. A machine for sharpening harrow-disks comprising a yoke, means for detachably securing said yoke to the hub or axle of the harrow adjacent to the disk to be sharpened, a slotted casting adjustably attached to said yoke, a slotted standard adjustably attached to said casting, a frame adjustably attached to said standard, a grinding-disk journaled in said frame, and gearing for rotating said disk journaled on said frame; with devices for regulating the depths of cut made by the grinding-disks adjustably attached to the standard adjacent to the frame.

18. A machine for sharpening the disks of disk harrows, comprising a split collar adapted to embrace the axle or hub of the harrow adjacent to the disk to be sharpened, a slotted standard adjustably attached to said collar, a frame adjustably attached to said standard, a grinding-disk journaled in said frame, and gearing for rotating said disk journaled on said frame.

19. A machine for sharpening the disks of disk harrows, comprising a yoke, a split collar attached to embrace the axle or hub of the harrow adjacent to the disk to be sharpened having a circumscribed groove adapted to be engaged by said yoke, a slotted casting adjustably attached to said yoke, a slotted standard attached to said casting, a frame adjustably attached to said standard, a grinding-disk journaled in said frame, and gearing for rotating said disk journaled on said frame.

In testimony that I claim the foregoing as my own I affix my signature in presence of two witnesses.

ASMUS HENRY GRIMM.

Witnesses:
J. SILAS LEAS,
MAUDE M. SMITH.